(12) United States Patent
Heller (10) Patent No.: US 9,988,142 B2
(45) Date of Patent: Jun. 5, 2018

(54) WING FOR AN AIRCRAFT, AND AN AIRCRAFT COMPRISING SUCH A WING

(71) Applicant: Airbus Operations GmbH, Hamburg (DE)

(72) Inventor: Gerd Heller, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days. days.

(21) Appl. No.: 15/460,107

(22) Filed: Mar. 15, 2017

(65) Prior Publication Data

US 2017/0247105 A1    Aug. 31, 2017

Related U.S. Application Data

(63) Continuation of application No. PCT/EP2015/069573, filed on Aug. 26, 2015.

(30) Foreign Application Priority Data

Sep. 16, 2014  (EP) .................................. 14185039

(51) Int. Cl.
  *B64C 23/06*  (2006.01)

(52) U.S. Cl.
  CPC .................. *B64C 23/069* (2017.05)

(58) Field of Classification Search
  CPC ... B64C 23/065; B64C 23/069; B64C 23/072; B64C 23/076
  See application file for complete search history.

(56) References Cited

U.S. PATENT DOCUMENTS

| 4,545,552 | A  | * | 10/1985 | Welles | .................... | B64C 39/10 244/90 R |
| 4,674,709 | A  | * | 6/1987 | Welles | .................... | B64C 39/10 244/45 R |
| 8,439,313 | B2 | * | 5/2013 | Rawdon | ................ | B64C 23/069 244/199.4 |
| 8,944,386 | B2 | * | 2/2015 | Gratzer | ................. | B64C 23/065 244/199.4 |

(Continued)

OTHER PUBLICATIONS

International Search Report and Written Opinion for Application No. PCT/EP2015/069573 dated Nov. 3, 2015.

(Continued)

*Primary Examiner* — Philip J Bonzell
(74) *Attorney, Agent, or Firm* — Jenkins, Wilson, Taylor & Hunt, P.A.

(57) ABSTRACT

A wing for an aircraft, including a main wing and a wing tip device, a front blade and a rear blade of the wing tip device extending from an attachment end, a front blade leading edge extending in front of a rear blade leading edge and a front blade trailing edge extending in front of a rear blade trailing edge, in a chord direction, and at a front blade tip the front blade extending under a different dihedral angle than the rear blade at a rear blade tip. The front blade leading and trailing edges, as well as the rear blade leading and trailing edges have a tangent-continuous developing. The front blade leading edge extends tangent-continuously with the wing leading edge. The rear blade trailing edge extends tangent-continuously with the wing trailing edge. The front blade trailing edge extends behind the rear blade leading edge, in the chord direction.

14 Claims, 10 Drawing Sheets

(56) References Cited

U.S. PATENT DOCUMENTS

| | | | |
|---|---|---|---|
| 9,038,963 B2* | 5/2015 | Gratzer | B64C 23/065 244/199.4 |
| 9,199,727 B2* | 12/2015 | Wright | B64C 23/065 |
| 9,302,766 B2* | 4/2016 | Gratzer | B64C 23/065 |
| 9,452,825 B2* | 9/2016 | Witte | B64C 23/065 |
| 9,527,581 B2* | 12/2016 | Bevirt | B64C 23/065 |
| 9,738,375 B2* | 8/2017 | Witte | B29C 70/44 |
| 2002/0162917 A1 | 11/2002 | Heller et al. | |
| 2009/0039204 A1 | 2/2009 | Eberhardt | |
| 2009/0084904 A1* | 4/2009 | Detert | B64C 23/065 244/199.4 |
| 2010/0019094 A1 | 1/2010 | Theurich et al. | |
| 2012/0312928 A1 | 12/2012 | Gratzer | |
| 2013/0092797 A1 | 4/2013 | Wright et al. | |
| 2013/0256460 A1 | 10/2013 | Roman et al. | |
| 2015/0217858 A1* | 8/2015 | Gratzer | B64C 23/065 244/199.4 |
| 2015/0239549 A1* | 8/2015 | Wright | B64C 23/065 244/199.4 |
| 2016/0001876 A1* | 1/2016 | Wright | B64C 23/065 244/199.4 |
| 2016/0176506 A1* | 6/2016 | Cross | B64C 9/00 416/1 |
| 2016/0214706 A1* | 7/2016 | Gratzer | B64C 23/065 |
| 2016/0355254 A1* | 12/2016 | Witte | B64C 23/065 |

OTHER PUBLICATIONS

Loebert, G., "Der Flügel mit Gabelspitzen als Mittel zur Erhöhung der Wirtschaftlichkeit von Transportflugzeugen," MBB-UFE 1344, p. 1, 1977.

* cited by examiner

WING FOR AN AIRCRAFT, AND AN AIRCRAFT COMPRISING SUCH A WING

CROSS-REFERENCE TO RELATED APPLICATION

This patent application is a continuation of International Application No. PCT/EP2015/069573 filed Aug. 26, 2015 which claims priority to European Patent Application No. 14185039.6 filed Sep. 16, 2014, the entire disclosures of which are incorporated by reference herein.

TECHNICAL FIELD

The present disclosure relates to a wing for an aircraft, as well as to an aircraft comprising such a wing. The wing comprises a main wing and a wing tip device. Within the meaning of the present disclosure the main wing includes any possible high-lift devices or ailerons.

BACKGROUND

The main wing comprises a wing leading edge, a wing trailing edge opposite to the wing leading edge, a wing root end which is configured to be mounted to a fuselage of a respective aircraft, and a wing tip end opposite to the wing root end. The wing tip device has an attachment end, a front blade and a rear blade. The attachment end is attached to the wing tip end of the main wing. The front blade has a front blade leading edge and a front blade trailing edge. The rear blade has a rear blade leading edge and a rear blade trailing edge. The front blade and the rear blade extend away from the attachment end in a diverging manner, i.e. they do not extend entirely in a common plane, although they might have sections extending in a common plane. The front blade leading edge extends in front of the rear blade leading edge, and the front blade trailing edge extends in front of the rear blade trailing edge, when viewed in a chord direction.

At the end of the wing tip device opposite to the attachment end, the front blade has a front blade tip, and the rear blade has a rear blade tip. On the front blade tip and on the rear blade tip, tip caps are attached for rounding and protecting the front and rear blade tips. At the front blade tip, the front blade extends under a different dihedral angle than the rear blade at the rear blade tip so that the front blade tip extends on a different level than the rear blade tip, when viewed in a wing thickness direction or along a yaw axis of an associated aircraft. The dihedral angle in general is measured with reference to a pitch axis of an associated aircraft in a plane spanned by the pitch axis and the yaw axis, or with reference to a horizontal plane when the aircraft is in a regular position on the ground. The dihedral angles at the front and rear blade tips, as well as all other angles defined at the front and rear blade tips under the present disclosure, are measured at the front blade tip and at the rear blade tip, respectively, right before the beginning of the tip caps, i.e. at the connection line to the tip caps, in particular as a tangent to the connection line.

The front blade leading edge and the front blade trailing edge both have a tangent-continuous developing without inflexion points or kinks. A tangent-continuous developing within the meaning of the present disclosure includes any continuously curved sections, as well as any straight sections which are connected to the continuously curved sections in such a manner that the developing of the tangent of the curved sections continuously transits into the straight sections, so that at the transition from the curved sections to the straight sections the tangent of the curved sections coincides with the straight sections. In other words, a tangent continuous developing excludes any kinks or discontinuities at the curved sections, straight sections, as well as at the transitions between curved and straight sections. Further, the rear blade leading edge and the rear blade trailing edge both have a tangent-continuous developing without inflexion points or kinks.

Wing tip devices in general are provided in the art in order to reduce the induced drag of a wing. Induced drag, also called lift dependent drag, occurs when lift is produced. Lift is produced by the wing through accelerating air mass downwards downstream of the wing with a certain momentum change equivalent to the lift produced. The continuous production of momentum consumes energy equivalent to the lift dependent drag. Minimizing induced drag requires minimizing the downward air deflection per span unit. Hence efficiency of the respective wing increases with higher span. In case of span limitations non-planar wings with wingtip devices help further minimizing the lift dependent drag. Due to wing flexibility upward pointing devices reduce the effective span more than downward pointing elements. Combining both elements while still respecting the need for a constant downwash distribution far downstream of the wing through the right aerodynamic loading helps to maximize the benefit. A constant downwash distribution represents a general optimization goal in order to minimize the induced drag a wing.

According to the prior art, various wings for an aircraft are known including wing tip devices as described above, or similar ones. For example, U.S. 2002/0162917 A1 discloses a wing comprising a wing tip device formed as a single blade which is curved upwards in a continuous manner. Similarly, U.S. 2010/0019094 A1 describes a wing tip device including a single blade which is curved upwards in a continuous manner leading into a straight tip section.

Also, double-blade wing tip devices are known in the art. For example, in the 1970's Richard T. Whitcomb developed a wing tip device which was later realized on the DC-10 and MD-11 aircraft. The wing tip device includes a small front blade which points downwards and a bigger rear blade which points upwards from the wing. Both blades are attached to the wing in a canted, discontinued manner which leads to an undesired complex flow in the junction region, in particular on the suction side of the wing, and consequently, undesired drag.

Similarly, in G. Loebert, *MBB-UFE* 1344, *"Der Flügel mit Gabelspitzen als Mittel zur Erhöhung der Wirtschaftlichkeit von Transportflugzeugen"*, 1977, a double-blade wing tip device is described comprising a front blade which extends upwards and a rear blade which extends downwards out of the wing plane. Yet again, both blades extend away from the wing in a cantered and discontinued manner, so that the specific flow challenges in the junction region which lead to undesired drag also apply here.

As a more recent example of a wing comprising a double-blade wing tip device, U.S. 2013/0256460 A1 discloses two fully overlapping blades, one pointing upwards and one pointing downwards out of the wing plane. However, also in this case the blades are connected to the main wing by hard, discontinued junctions, thereby challenging the flow in these junction areas. Further, both blades extend from a common root, so that they overlap over their entire span, which also causes undesired flow conditions.

From U.S. 2012/0312928 A1 a wing tip device is known having two blades, wherein an upper blade extends in a continuous manner upwards from the tip of the main wing.

However, the lower blade, which is mounted to the upper blade in a fully overlapping manner, again extends away from the upper blade under a certain kink, i.e. in a discontinued manner, so that the flow in the kink area is undesirably challenged and drag is caused. U.S. 2013/0092797 A1 describes a similar wing tip device comprising an upper blade, which is formed continuously on the tip of the main wing and extends upwards in a straight way, and a smaller lower blade which is connected to the junction of the upper blade in a discontinued manner.

The "Morphing Airplane" developed by NASA comprises a wing including a wing tip device having two blades pointing upwards under a similar dihedral angle, wherein the blades are formed with the wing in a continuous manner, wherein a front blade exists in front of a rear blade such far that, however, they do not overlap at all and the wing tip has an undesirable large extent in a chord direction, and, thus, an undesirable high weight at the wing tip.

Finally, U.S. 2009/0084904 A1 describes a wing tip device having a front blade and a rear blade which are attached to the main wing in a subsequent manner, i.e. by a certain staggering. Yet, the staggering involves a gap between the front blade and the rear blade so that front and rear blade do not overlap at all. Further, again the front blade and the rear blade are attached to the main wing in a discontinued manner including kinks.

SUMMARY

Therefore, an object of the present disclosure is to provide a wing for an aircraft, wherein for a predetermined span dimension the induced drag can be significantly reduced.

This object is achieved in that the front blade leading edge extends tangent-continuously with the wing leading edge without any kink, i.e. the transition from the front blade leading edge to the wing leading edge extends tangent-continuously without any kink. Similarly, the rear blade trailing edge extends tangent-continuously with the wing trailing edge without any kink, i.e. the transition from the rear blade trailing edge to the wing trailing edge extends tangent-continuously without any kink. Further, the front blade trailing edge at least partially extends behind the rear blade leading edge, when viewed in a chord direction from the wing leading edge to the wing trailing edge, so that the front blade and the rear blade overlap one another in an overlapping area, when viewed in the wing thickness direction.

In such a way, in particular by such a form of the wing tip device having two diverging and partially overlapping blades which extend as a continuous extension of the main wing, a desired constant downwash distribution can be obtained. As a consequence, for a predetermined wing length the induced drag can be considerably reduced.

In a preferred embodiment, the front blade trailing edge intersects, i.e. crosses, the rear blade leading edge, when viewed in the wing thickness direction, so that near the attachment end the front blade trailing edge extends behind the rear blade leading edge, thereby forming the overlapping area, and remote from the attachment end the front blade trailing edge extends in front of the rear blade leading edge, so that no overlapping is present here, when viewed in the chord direction. In such a way, a particularly advantage flow condition can be established on the wing tip device.

In an alternative preferred embodiment the front blade trailing edge does not intersect or cross the rear blade leading edge, when viewed in the wing thickness direction, so that along the entire front blade trailing edge and/or along the entire rear blade leading edge the front blade trailing edge extends behind the rear blade leading edge, thereby forming the overlapping area over their entire length, when viewed in the chord direction. In such a way, a particularly advantage flow condition can be established on the wing tip device.

Both of the before-described alternatives are advantageous with respect to a possibly constant downwash distribution, and it may be decided in a case-by-case manner which alternative is more favorable for the respective case.

In a further preferred embodiment the front blade and the rear blade have a common base section and separate tip sections. The base section, which might have a significant or an insignificant extent in the span direction, is defined between the front blade leading edge, the rear blade trailing edge, the attachment end, and opposite to the attachment end a front blade root where a front blade tip section is rooted in the base section, and a rear blade root where a rear blade tip section is rooted in the base section. Preferably, between the front blade root and the rear blade root, when viewed in the wing thickness direction, a junction line or junction zone is provided which represents the line or zone in which the front blade and the rear blade intersect or merge. In the base section the front blade and the rear blade are merged or joined to a common structure which then can be advantageously connected to the wing tip end of the main wing at the attachment end. However, it is also possible that the base section is formed insignificantly short in the span direction so that the separate blades, in particular the front blade tip section and the rear blade tip section, are directly or almost directly attached to the wing tip end. The front blade root and the rear blade root represent sections where the front blade and the rear blade, respectively, merge or join to form the common base section, and the junction line represents the between the front blade root and the rear blade root, connecting these roots, i.e. the line where the outline of these roots meet and overlap.

In particular, it is preferred that the wing tip device is formed and attached to the main wing in the following manner. A sweep angle of the front blade leading edge, when measured at the attachment end, corresponds to the sweep angle of the wing leading edge, when measured at the wing tip end, and preferably is between 25° and 45°. Any sweep angle within the meaning of the present disclosure is measured with respect to a pitch axis of an associated aircraft, when viewed in a horizontal plane, i.e. a plane spanned by the pitch axis and the roll axis of an associated aircraft. Preferably, a sweep angle of the front blade trailing edge, when measured at the front blade root, corresponds to an angle between the sweep angle of the wing trailing edge and the sweep angle of the wing leading edge, when measured at the wing tip end, and preferably is between 20° and 40°.

Preferably, a sweep angle of the rear blade leading edge, when measured at the rear blade root, corresponds to an angle between the sweep angle of the wing leading edge and twice the sweep angle of the wing leading edge, when measured at the wing tip end, and preferably is between 25° and 45°. Preferably, a sweep angle of the rear blade trailing edge, when measured at the attachment end, corresponds to the sweep angle of the wing trailing edge, when measured at the wing tip end, and preferably is between 20° and 40°.

Preferably, a sweep angle of the front blade leading edge, when measured at the front blade tip, corresponds to an angle between the sweep angle of the wing leading edge and twice the sweep angle of the wing leading edge, when measured at the wing tip end, and preferably is between 45° and 60°. Preferably, a sweep angle of the front blade trailing edge, when measured at the front blade tip, corresponds to an angle between the sweep angle of the wing trailing edge and twice the sweep angle of the wing leading edge, when measured at the wing tip end, and preferably is between 40° and 55°. Any sweep angle defined at the front blade tip or at the rear blade tip within the meaning of the resent disclosure herein is measured right before the beginning of the tip caps, i.e. at the connection line to the tip caps, in particular as a tangent to the connection line.

Preferably, a sweep angle of the rear blade leading edge, when measured at the rear blade tip, corresponds to an angle between the sweep angle of the wing leading edge and twice the sweep angle of the wing leading edge, when measured at the wing tip end, and preferably is between 45° and 60°. Preferably, a sweep angle of the rear blade trailing edge, when measured at the rear blade tip, corresponds to an angle between the sweep angle of the wing trailing edge and twice the sweep angle of the wing trailing edge, when measured at the wing tip end, and preferably is between 40° and 55°.

By such geometry of the wing, in particular by such sweep angles, an advantageous constant downwash distribution can be obtained and the induced drag can be considerably reduced. Also, the production of wave drag can be considerable reduced.

Further particular, it is preferred that the wing tip device is formed in the following manner. The extent of the front blade in the chord direction, when measured at the front blade root, is between 20% and 80%, preferably between 40% and 60%, of the extent of the wing tip device in the chord direction, when measured at the attachment end. Preferably, the extent of the front blade in the chord direction, when measured at the front blade tip, is between 10% and 40%, preferably between 15% and 30%, of the extent of the wing tip device in the chord direction, when measured at the attachment end. Preferably, the extent of the rear blade in the chord direction, when measured at the rear blade root, is between 20% and 80%, preferably between 40% and 60%, of the extent of the wing tip device in the chord direction, when measured at the attachment end Preferably, the extent of the rear blade in the chord direction, when measured at the rear blade tip, is between 10% and 40%, preferably between 15% and 30%, of the extent of the wing tip device in the chord direction, when measured at the attachment end.

By such geometry of the wing, in particular by such chord extents, a desired constant downwash distribution can be obtained and the induced drag can be considerably reduced. Also, the production of wave drag can be considerable reduced.

It is also preferred that the wing tip device is formed in the following manner. The extent of the front blade in a span direction, when measured between the attachment end and the front blade tip, is between 50% and 300%, preferably between 100% and 200%, of the extent of the wing tip device in the chord direction, when measured at the attachment end. Preferably, the extent of the rear blade in a span direction, when measured between the attachment end and the rear blade tip, is between 50% and 300%, preferably between 100% and 200%, of the extent of the wing tip device in the chord direction, when measured at the attachment end. By such geometry of the wing, in particular by such span extents, an advantageous constant downwash distribution can be obtained and the induced drag can be considerably reduced.

In a preferred embodiment the main wing defines a wing plane which is approximately flat, wherein the front blade extends downwards, i.e. points downwards, out of the wing plane and wherein the rear blade extends upwards, i.e. points upwards, out of the wing plane, with reference to the wing thickness direction, or the yaw axis of an associated aircraft. This configuration allows a natural meshing of the pressure distributions from the front blade upper side and rear blade lower side in the overlapping area. Furthermore, any leading edge device integration, for instance a slat, can be easier. Also, under transonic flow conditions dependent on the shock topology of the main wing the shock topology on the wing tip device can be smoothly connected.

In particular, it is preferred that the wing tip device is formed in the following manner. The extent of the overlapping area, when measured along the junction line, is between 5% and 30%, preferably between 15% and 25%, of the extent of the wing tip device in the chord direction, when measured at the attachment end. Preferably, the dihedral angle of the front blade leading edge, when measured at the attachment end, corresponds to the dihedral angle of the wing leading edge, when measured at the wing tip end. Preferably, the dihedral angle of the rear blade trailing edge, when measured at the attachment end, corresponds to the dihedral angle of the wing trailing edge, when measured at the wing tip end. Any dihedral angle within the meaning of the present disclosure is measured with respect to a pitch axis of an associated aircraft, when viewed in a vertical plane, i.e. a plane spanned by the pitch axis and the yaw axis of an associated aircraft.

Preferably, the dihedral angle of the front blade, when measured at the front blade tip, is between −10° and −60°, preferably between −20° and −45°. Preferably, the dihedral angle of the rear blade, when measured at the rear blade tip, is between 30° and 90°, preferably between 45° and 70°. Preferably, the junction angle between the front blade and the rear blade along the junction line, when measured at the rear blade leading edge is between 0° and 45°, preferably between 10° and 30°. Preferably, the junction angle between the front blade and the rear blade along the junction line, when measured at the front blade trailing edge is between 45° and 100°, preferably between 50° and 80°.

By such geometry of the wing, in particular by such extents of the overlapping area, by such dihedral angles, and by such junction angles, a desired constant downwash distribution can be obtained and the induced drag can be considerably reduced. Also, the production of wave drag can be considerable reduced.

In a preferred embodiment the main wing defines a wing plane which is approximately flat, wherein the front blade extends upwards, i.e. points upwards, out of the wing plane and wherein the rear blade extends downwards, i.e. points downwards, out of the wing plane, with reference to the wing thickness direction or the yaw axis of an associated aircraft. Under transonic flow conditions, dependent on the shock topology of the main wing the shock topology on the wing tip device can be smoothly connected.

In particular, it is preferred that the wing tip device is formed in the following manner. The extent of the overlapping area, when measured along the junction line, is between 5% and 25%, preferably between 10% and 15%, of the extent of the wing tip device in the chord direction, when measured at the attachment end. Preferably, the dihedral angle of the front blade leading edge, when measured at the attachment end, corresponds to the dihedral angle of the wing leading edge, when measured at the wing tip end. Preferably, the dihedral angle of the rear blade trailing edge, when measured at the attachment end, corresponds to the dihedral angle of the wing trailing edge, when measured at the wing tip end.

Preferably, the dihedral angle of the front blade, when measured at the front blade tip, is between 30° and 90°, preferably between 45° and 70°. Preferably, the dihedral angle of the rear blade, when measured at the rear blade tip, is between −20° and −60°, preferably between −30° and −45°, Preferably, the junction angle between the front blade and the rear blade along the junction line, when measured at the rear blade leading edge is between 0° and 45°, preferably between 10° and 30°. Preferably, the junction angle between the front blade and the rear blade along the junction line, when measured at the front blade trailing edge is between 45° and 100°, preferably between 50° and 80°.

By such geometry of the wing, in particular by such extents of the overlapping area, by such dihedral angles, and by such junction angles, a desired constant downwash distribution can be obtained and the induced drag can be considerably reduced. Also, the production of wave drag can be considerable reduced.

In a preferred embodiment the main wing defines a wing plane which is approximately flat, wherein the front blade extends approximately flat in the wing plane and wherein the rear blade extends upwards, i.e. points upwards, out of the wing plane, with reference to the wing thickness direction or the yaw axis of an associated aircraft. This configuration allows a natural meshing of the pressure distributions from the front blade upper side and rear blade lower side in the overlapping area. Furthermore, any leading edge device integration, for instance a slat, can be easier. Also, under transonic flow conditions dependent on the shock topology of the main wing the shock topology on the wing tip device can be smoothly connected. Finally, ground operation can be easier without downward pointing blades.

In particular, it is preferred that the wing tip device is formed in the following manner. The extent of the overlapping area, when measured along the junction line, is between 5% and 15%, preferably between 5% and 10%, of the extent of the wing tip device in the chord direction, when measured at the attachment end. Preferably, the dihedral angle of the front blade leading edge, when measured at the attachment end, corresponds to the dihedral angle of the wing leading edge, when measured at the wing tip end. Preferably, the dihedral angle of the rear blade trailing edge, when measured at the attachment end, corresponds to the dihedral angle of the wing trailing edge, when measured at the wing tip end.

Preferably, the dihedral angle of the front blade, when measured at the front blade tip, corresponds to the dihedral angle of the wing leading edge, when measured at the wing tip end. Preferably, the dihedral angle of the rear blade, when measured at the rear blade tip, is between 30° and 90°, preferably between 45° and 70°. Preferably, the junction angle between the front blade and the rear blade along the junction line, when measured at the rear blade leading edge is between 0° and 45°, preferably between 10° and 30°. Preferably, the junction angle between the front blade and the rear blade along the junction line, when measured at the front blade trailing edge is between 20° and 60°, preferably between 30° and 45°.

By such geometry of the wing, in particular by such extents of the overlapping area, by such dihedral angles, and by such junction angles, a desired constant downwash distribution can be obtained and the induced drag can be considerably reduced. Also, the production of wave drag can be considerable reduced.

A further aspect of the present disclosure relates to an aircraft comprising the wing according to any of the afore- described embodiments. The features and advantages described above in connection with the wing also apply for the aircraft.

BRIEF DESCRIPTION OF THE DRAWINGS

In the following, embodiments of the present disclosure are described in more detail by drawings, in which.

DETAILED DESCRIPTION

Figure 1:
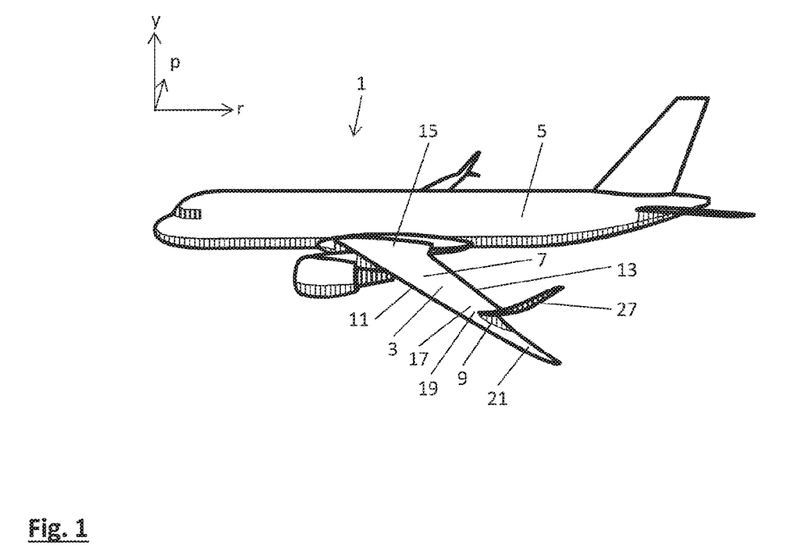
FIG. 1 is a perspective side view of an aircraft comprising a wing according to a first embodiment of the present disclosure.
Figure 2:
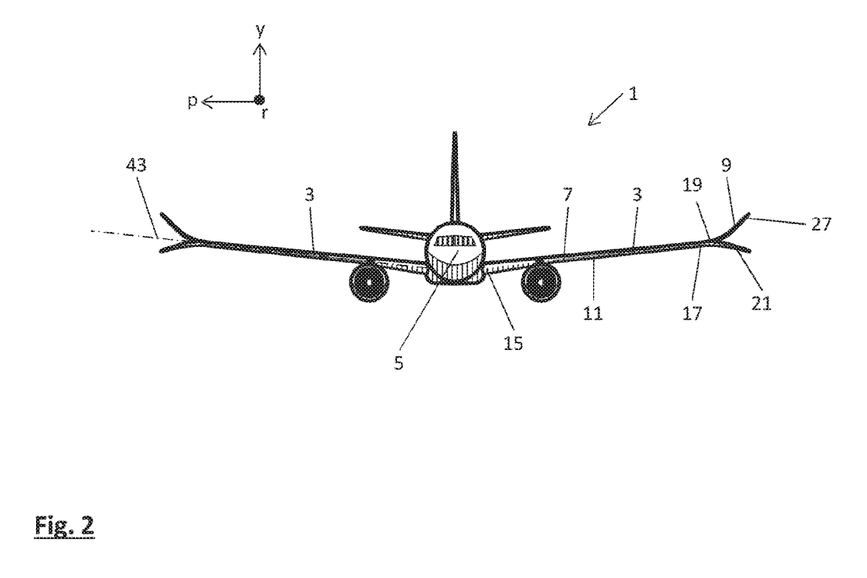
FIG. 2 is a front view of the aircraft of FIG. 1.
Figure 3:
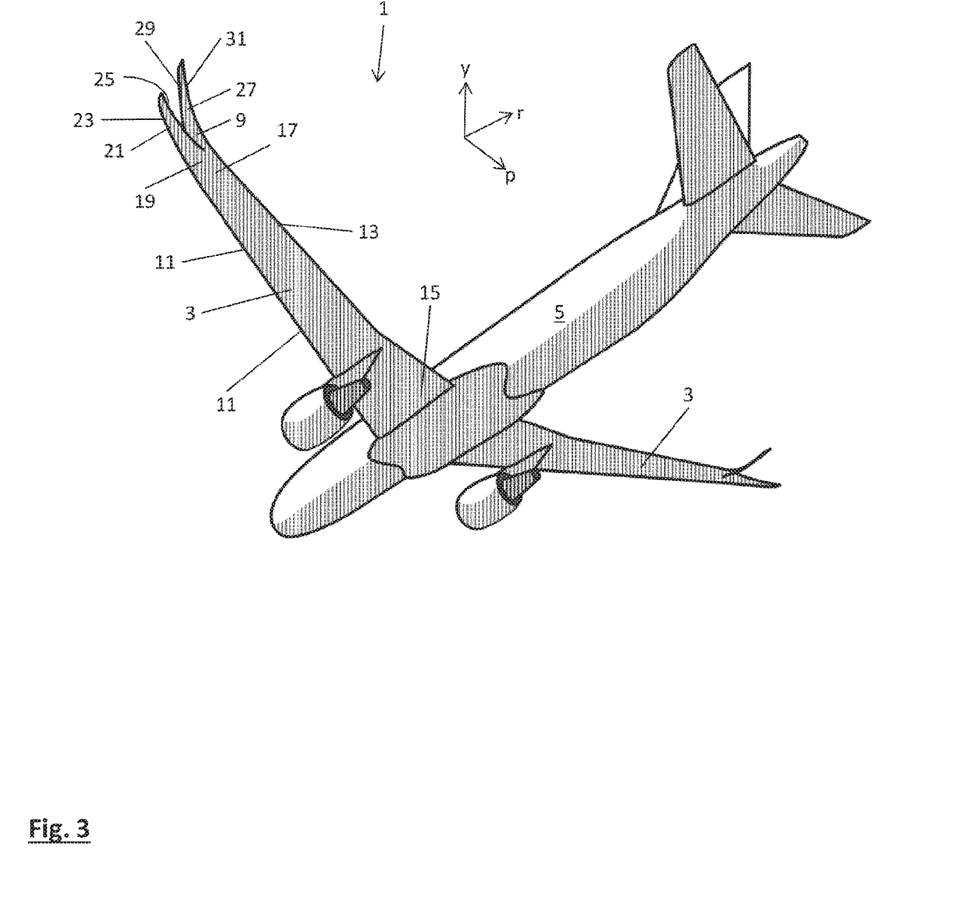
FIG. 3 is a perspective view from below of the aircraft of FIG. 1.
Figure 4:
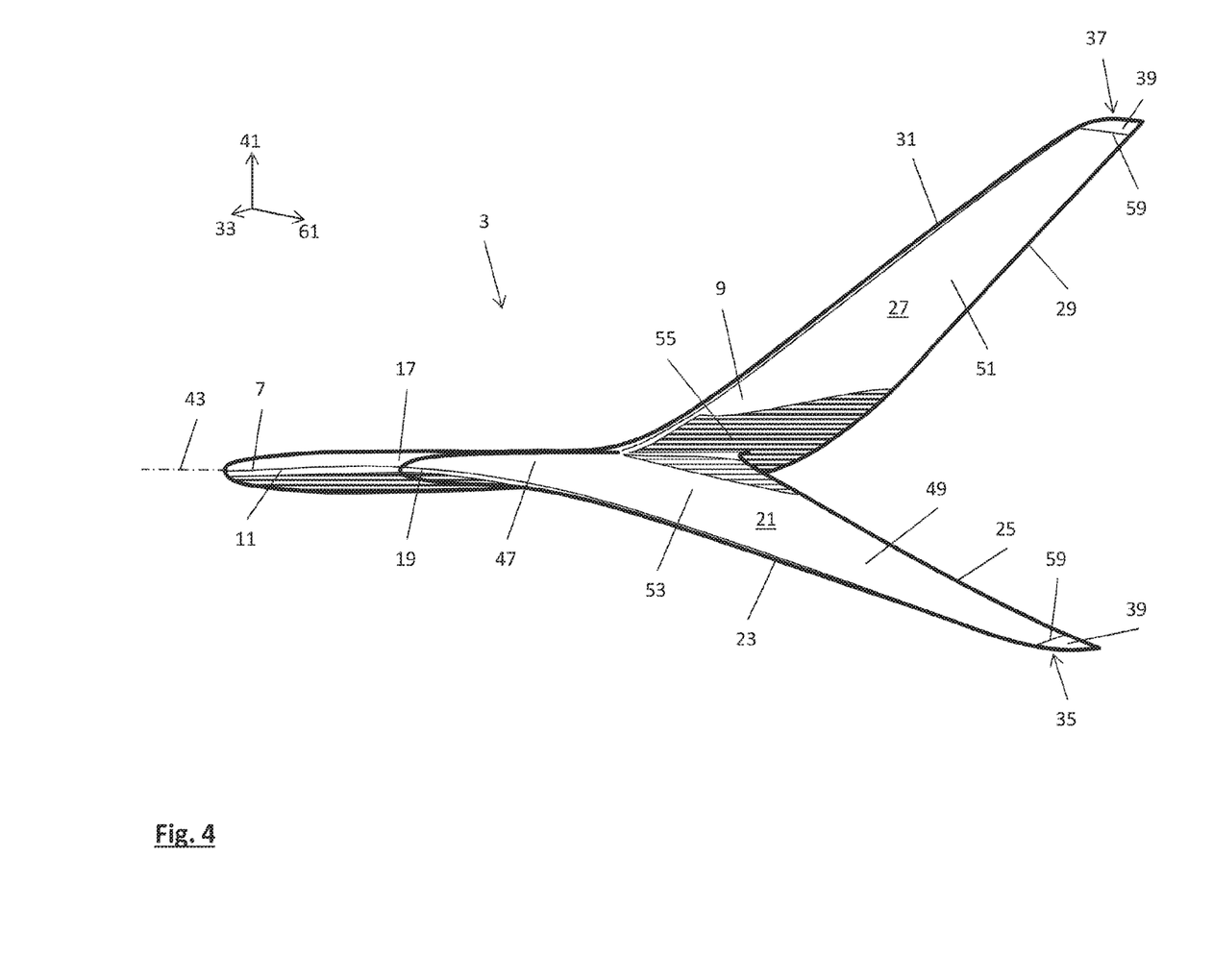
FIG. 4 is a perspective side view of a section of the wing of the aircraft of FIG. 1.
Figure 5:
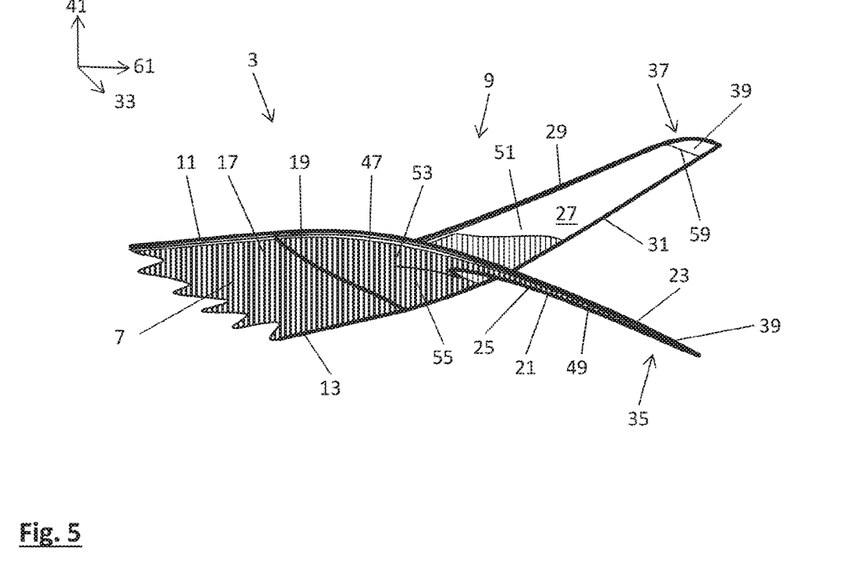
FIG. 5 is a perspective view from below of the section of FIG. 4.
Figure 6:
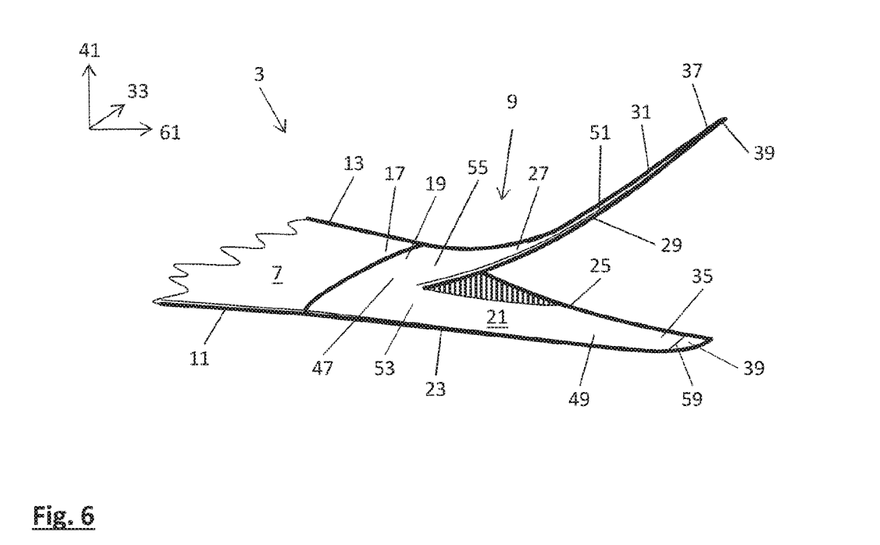
FIG. 6 is a perspective view from above of the section of FIG. 4.
Figure 7:
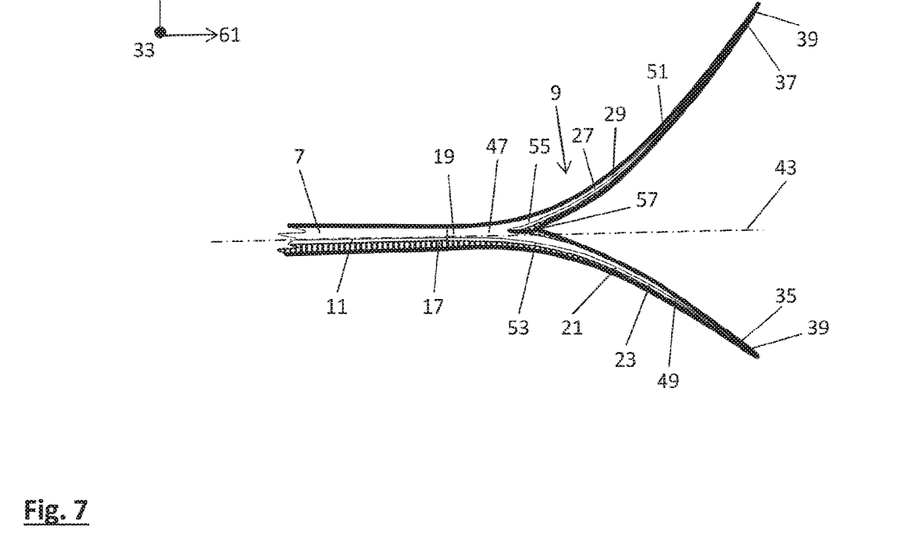
FIG. 7 is a front view of the section of FIG. 4.
Figure 8:
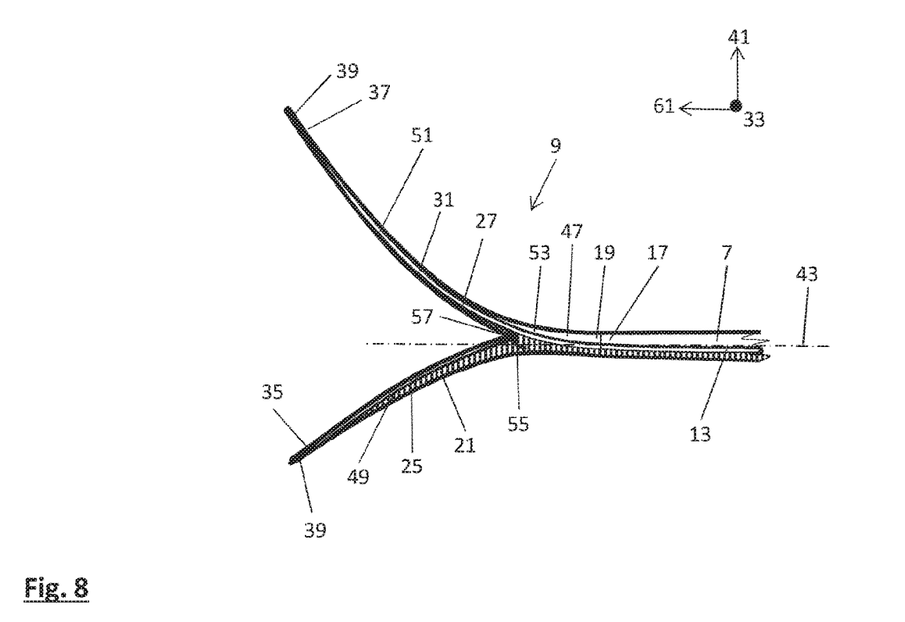
FIG. 8 is a rear view of the section of FIG. 4.

In FIGS. 1 through 3 an aircraft 1 comprising a wing 3 according to a first embodiment of the present disclosure is illustrated. The aircraft 1 comprises a fuselage 5 and two opposite wings 3 mounted to the fuselage 5. Each wing 3 comprises a main wing 7 and a wing tip device 9.

The main wing 7 has a wing leading edge 11, a wing trailing edge 13 opposite to the wing leading edge 11, a wing root end 15 which is mounted to the fuselage 5, and a wing tip end 17 opposite to the wing root end 15. The wing tip device 9 has an attachment end 19 which is attached to the wing tip end 17 of the main wing 7, a front blade 21 having a front blade leading edge 23 and a front blade trailing edge 25, and a rear blade 27 having a rear blade leading edge 29 and a rear blade trailing edge 31.

As shown in more detail in FIGS. 4 through 9, the front blade 21 and the rear blade 27 extend away from the attachment end 19 in a diverging manner. Front blade 21 and rear blade 27 are staggered, so that the front blade leading edge 23 extends in front of the rear blade leading edge 29 and the front blade trailing edge 25 extends in front of the rear blade trailing edge 31, when viewed in a chord direction 33 of the wing 3. At the end of the wing tip device 9 opposite to the attachment end 19 the front blade 21 has a front blade tip 35 and the rear blade has a rear blade tip 37. Tip caps 39 are provided on front and rear blade tips 35, 37. At the front blade tip 35 the front blade 21 extends under a different dihedral angle v than the rear blade 27 at the rear blade tip 37, so that the front blade tip 35 extends on a different level than the rear blade tip 37, when viewed in a wing thickness direction 41. The dihedral angle v in general is measured with reference to a pitch axis p of an associated aircraft 1 in a plane spanned by the pitch axis p and the yaw axis y. In the present embodiment the main wing 7 defines a wing plane 43 and the front blade 21 extends downwards out of the wing plane 43 while the rear blade 27 extends upwards out of the wing plane 43, with reference to the wing thickness direction 41.

The front blade leading edge 23 and the front blade trailing 25 edge both have a tangent-continuous, in the present embodiment a continuously curved, developing without inflexion points and kinks. Similarly, the rear blade leading edge 29 and the rear blade trailing edge 31 both have a tangent-continuous, in the present embodiment a continuously curved, developing without inflexion points and kinks. The front blade leading edge 23 extends tangent-continuously with the wing leading edge 11 without a kink, and the rear blade trailing edge 31 extends tangent-continuously with the wing trailing edge 13 without a kink. The front blade trailing edge 25 at least partially extends behind the rear blade leading edge 29, when viewed in the chord direction 33 from the wing leading edge 11 to the wing trailing edge 13, so that the front blade 21 and the rear blade 27 overlap one another in an overlapping area 45, when viewed in the wing thickness direction 41.

Figure 9:
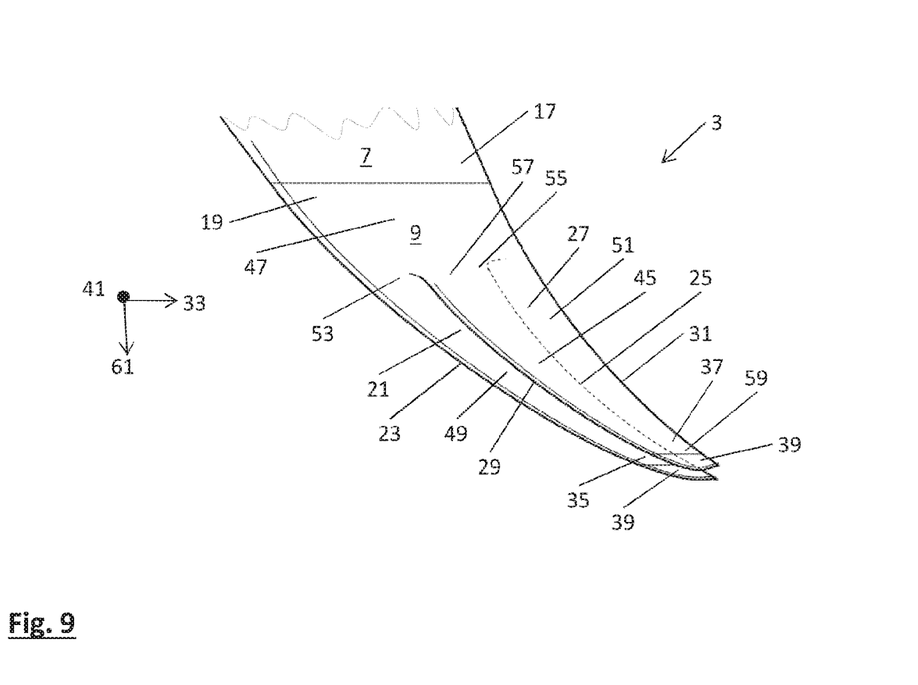
FIG. 9 is a top view of the section of FIG. 4.

As shown in FIG. 9, in the present embodiment the front blade trailing edge 25 does not intersect the rear blade leading edge 29, when viewed in the wing thickness direction 41, so that along the entire rear blade leading edge 29 the front blade trailing edge 25 extends behind the rear blade leading edge 29, thereby forming the overlapping area 45 over the entire length of the rear blade leading edge 29, when viewed in the chord direction 33. Alternatively, as described in connection with the embodiment shown FIGS. 13 to 18, the front blade trailing edge 25 may also intersect the rear blade leading edge 29, when viewed in the wing thickness direction 41, so that near the attachment end 19 the front blade trailing edge 25 extends behind the rear blade leading edge 29, thereby forming the overlapping area 45, and remote from the attachment end 19 the front blade trailing edge 25 extends in front of the rear blade leading edge 29, when viewed in the chord direction 33.

The front blade 21 and the rear blade 27 have a common base section 47 and separate tip sections 49, 51. The base section 47 is defined between the front blade leading edge 23, the rear blade trailing edge 31, the attachment end 19, and opposite to the attachment end 19 a front blade root 53 where a front blade tip section 49 is rooted in the base section 47, and a rear blade root 55 where a rear blade tip section 51 is rooted in the base section 47. Between the front blade root 53 and the rear blade root 55, when viewed in the wing thickness direction 41, a junction line 57 is provided, as also illustrated in connection with the embodiment shown in FIGS. 13 to 15.

Figure 10:
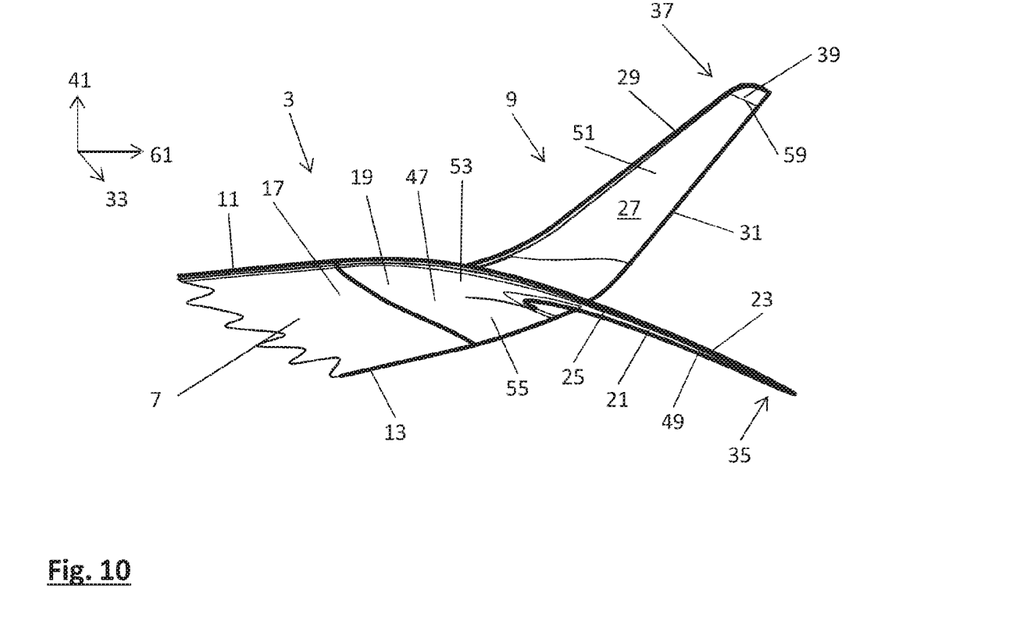
FIG. 10 is a perspective view from below of a section of a wing according to a second embodiment of the present disclosure, having a straight rear blade.

In FIG. 10 a second embodiment of a wing 3 according to the disclosure herein is illustrated which is similar to the embodiment described in connection with FIGS. 1 to 9, so that corresponding reference numerals are used for similar features. The wing 3 shown in FIG. 10 differs from the embodiment shown in FIG. 1 through 9 in that the rear blade tip section 51, in particular at the rear blade leading edge 29 and at the rear blade trailing edge 31, from the base section 47 to the rear blade tip 37 after a curved developing has a straight developing which is not curved anymore. The transition of the curved developing to the straight developing is tangent-continuous, i.e. without any kinks or discontinuities.

Figure 11:
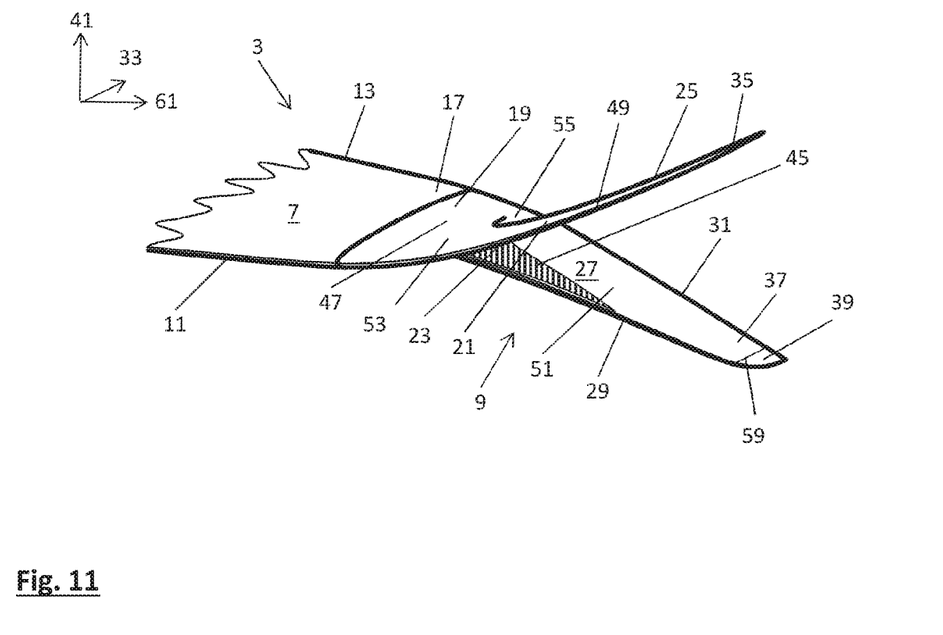
FIG. 11 is a perspective view from above of a section of a wing according to a third embodiment of the present disclosure, wherein the front blade points upwards and the rear blade points downwards out of the wing plane.

In FIG. 11 a third embodiment of a wing 3 according to the disclosure herein is illustrated which is similar to the embodiment described in connection with FIGS. 1 through 9, so that corresponding reference numerals are used for similar features. The wing 3 shown in FIG. 11 differs from the embodiment shown in FIG. 1 through 9 in that the front blade 21 extends upwards out of the wing plane 43 and the rear blade 27 extends downwards out of the wing plane 43, with reference to the wing thickness direction 41.

Figure 12:
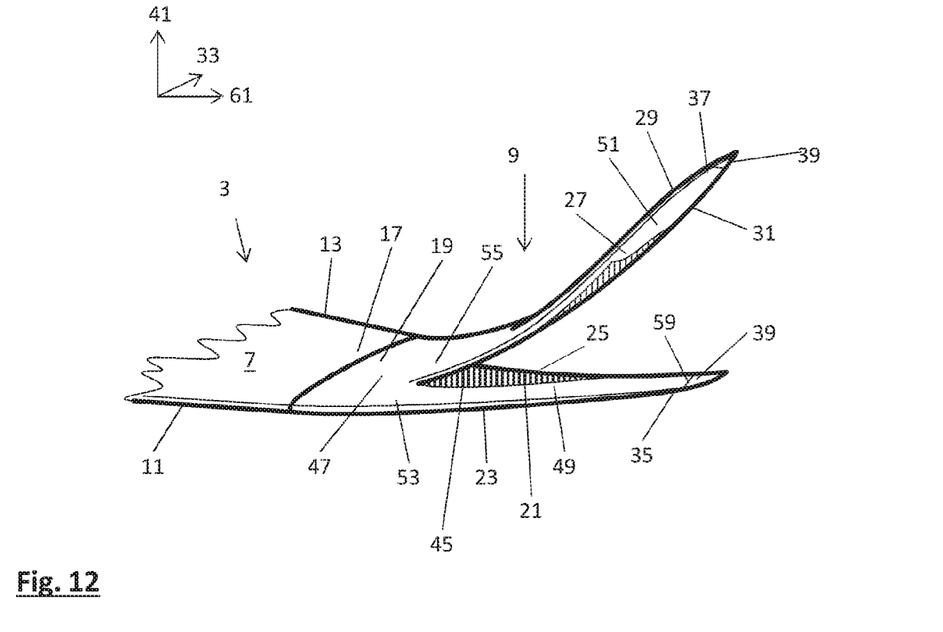
FIG. 12 is a perspective view from above of a section of a wing according to a fourth embodiment of the present disclosure, wherein the front blade extends flat in the wing plane and the rear blade points upwards out of the wing plane.

In FIG. 12 a fourth embodiment of a wing 3 according to the disclosure herein is illustrated which is similar to the embodiment described in connection with FIGS. 1 through 9, so that corresponding reference numerals are used for similar features. The wing 3 shown in FIG. 12 differs from the embodiment shown in FIG. 1 through 9 in that the front blade 21 extends approximately flat in the wing plane 43 and the rear blade 27 extends upwards out of the wing plane 43, with reference to the wing thickness direction 41.

In FIGS. 13 to 18 a fifth embodiment of a wing 3 according to the disclosure herein is illustrated which is similar to the embodiment described in connection with FIGS. 1 through 9, so that corresponding reference numerals are used for similar features. The wing 3 shown in FIGS. 13 to 18 differs from the embodiment shown in FIG. 1 through 9 in that the front blade trailing edge 25 intersects the rear blade leading edge 29, when viewed in the wing thickness direction 41, so that near the attachment end 19 the front blade trailing edge 25 extends behind the rear blade leading edge 29, and remote from the attachment end 19 the front blade trailing edge 25 extends in front of the rear blade leading edge 29, when viewed in the chord direction 33.

In connection with the present embodiment the geometry of the wing 3, in particular the geometry of the wing tip device 9, is further specified in the following.

Figure 13:
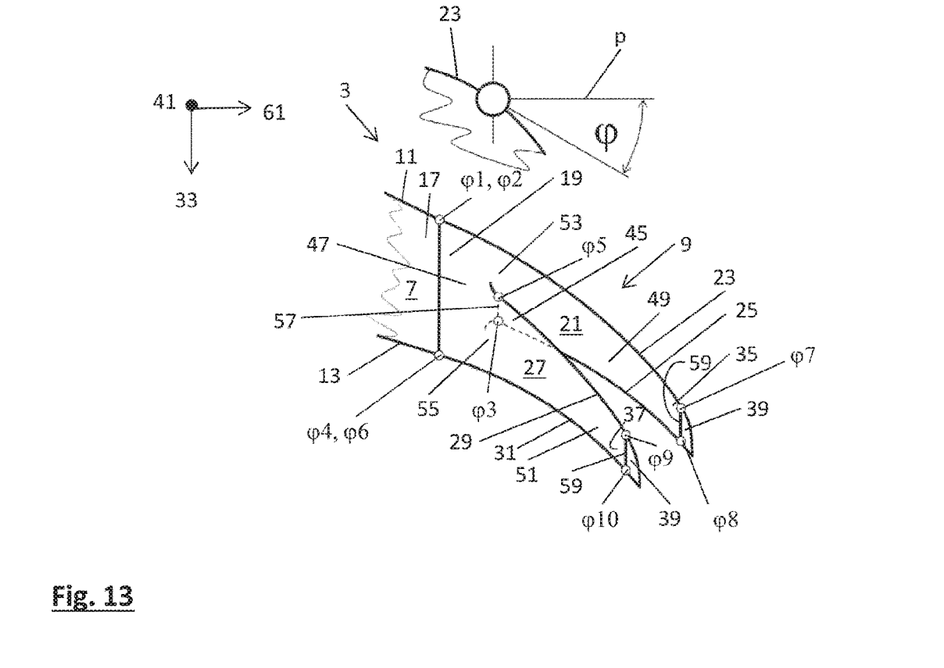
FIG. 13 is a top view of a section of a wing according to a fifth embodiment of the present disclosure, wherein the relevant positions for measuring a sweep angle are indicated.

As shown in FIG. 13, a sweep angle distribution of the wing tip device 9 is addressed. The sweep angle $\varphi$ in general represents the angle with respect to the pitch axis p of the associated aircraft 1 in a plane spanned by the roll axis r and the pitch axis. A sweep angle $\varphi 1$ of the front blade leading edge 23, when measured at the attachment end 19, corresponds to the sweep angle $\varphi 2$ of the wing leading edge 11, when measured at the wing tip end 17, and in the present embodiment is approximately 36°. A sweep angle $\varphi 3$ of the front blade trailing edge 25, when measured at the front blade root 53, corresponds to an angle between the sweep angle $\varphi 4$ of the wing trailing edge 13 and the sweep angle $\varphi 2$ of the wing leading edge 11, when measured at the wing tip end 17, and in the present embodiment is approximately 31°. A sweep angle φ5 of the rear blade leading edge 29, when measured at the rear blade root 55, corresponds to an angle between the sweep angle φ2 of the wing leading edge 11 and twice the sweep angle φ2 of the wing leading edge 11, when measured at the wing tip end 17, and in the present embodiment is approximately 40°. A sweep angle φ6 of the rear blade trailing edge 31, when measured at the attachment end 19, corresponds to the sweep angle φ4 of the wing trailing edge 13, when measured at the wing tip end 17, and in the present embodiment is approximately 25°.

A sweep angle φ which is measured at the front or rear blade tips 35, 37 is measured right before the beginning of the tip caps 39, i.e. at the connection line 59 to the tip caps 39. A sweep angle φ7 of the front blade leading edge 23, when measured at the front blade tip 35, corresponds to an angle between the sweep angle φ2 of the wing leading edge 11 and twice the sweep angle φ2 of the wing leading edge 11, when measured at the wing tip end 17, and in the present embodiment is approximately 65°. A sweep angle φ8 of the front blade trailing edge 25, when measured at the front blade tip 35, corresponds to an angle between the sweep angle φ4 of the wing trailing edge 13 and twice the sweep angle φ2 of the wing leading edge 11, when measured at the wing tip end 17, and in the present embodiment is approximately 52°. A sweep angle φ9 of the rear blade leading edge 29, when measured at the rear blade tip 37, corresponds to an angle between the sweep angle φ2 of the wing leading edge 11 and twice the sweep angle φ2 of the wing leading edge 11, when measured at the wing tip end 17, and in the present embodiment is approximately 65°. A sweep angle φ10 of the rear blade trailing edge 31, when measured at the rear blade tip 37, corresponds to an angle between the sweep angle φ4 of the wing trailing edge 13 and twice the sweep angle φ4 of the wing trailing edge 13, when measured at the wing tip end 17, and in the present embodiment is approximately 52°.

Figure 14:
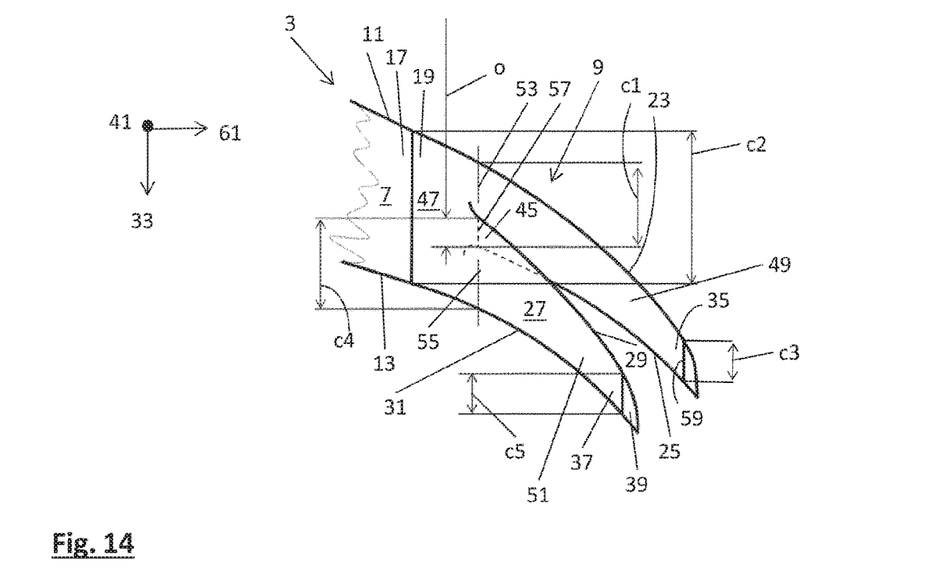
FIG. 14 is a top view of the section of FIG. 13, wherein the relevant positions for measuring a chord extent and an overlap are indicated.

As shown in FIG. 14, a chord extent c of the wing tip device 9 is addressed. The extent c1 of the front blade 21 in the chord direction 33, when measured at the front blade root 53, is approximately 60% of the extent c2 of the wing tip device 9 in the chord direction 33, when measured at the attachment end 19. The extent c3 of the front blade 21 in the chord direction 33, when measured at the front blade tip 35, is approximately 25% of the extent c2 of the wing tip device 9 in the chord direction 33, when measured at the attachment end 19. The extent c4 of the rear blade 27 in the chord direction 33, when measured at the rear blade root 55, is approximately 50% of the extent c2 of the wing tip device 9 in the chord direction 33, when measured at the attachment end 19. The extent c5 of the rear blade 27 in the chord direction 33, when measured at the rear blade tip 37, is approximately 25% of the extent c2 of the wing tip device 9 in the chord direction 33, when measured at the attachment end 19.

Figure 15:
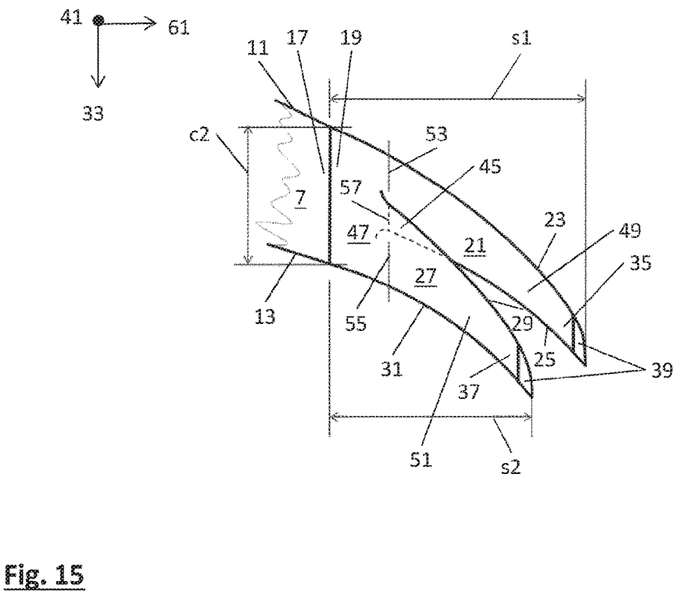
FIG. 15 is a top view of the section of FIG. 13, wherein the relevant positions for measuring a span extent are indicated.

As shown in FIG. 15, a span extent s of the wing tip device 9 is addressed. The extent s1 of the front blade 21 in a span direction 61, when measured between the attachment end 19 and the front blade tip 35, is approximately 170% of the extent c2 of the wing tip device 9 in the chord direction 33, when measured at the attachment end 19. The extent s2 of the rear blade 27 in a span direction 61, when measured between the attachment end 19 and the rear blade tip 37, is approximately 160% of the extent c2 of the wing tip device 9 in the chord direction 33, when measured at the attachment end 19.

As shown in FIG. 14, an overlap extent o of the wing tip device 9 is addressed. The extent o of the overlapping area 45, when measured along the junction line 57, is approximately 30% of the extent c2 of the wing tip device 9 in the chord direction 33, when measured at the attachment end 19.

Figure 16:
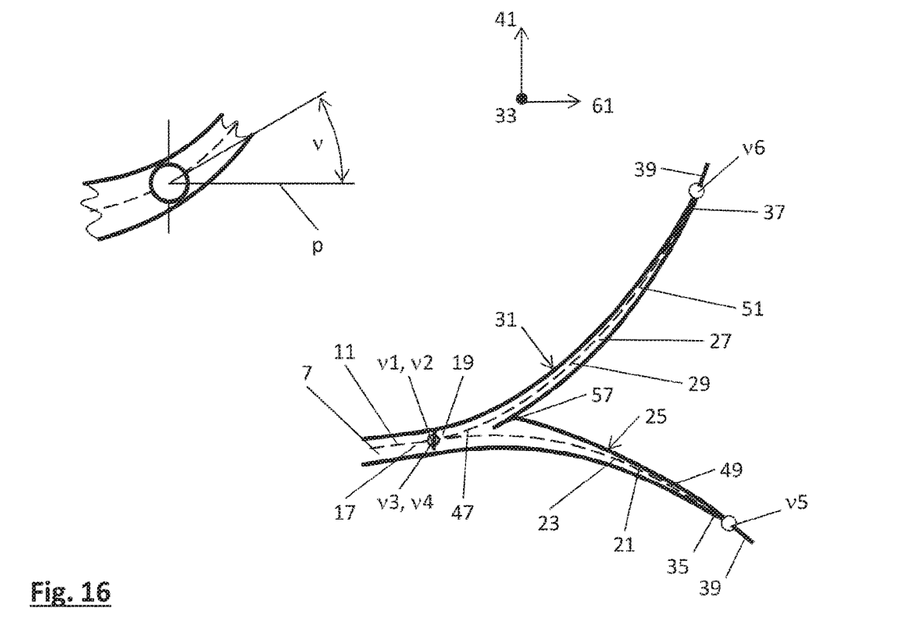
FIG. 16 is a side view of the section of FIG. 13, wherein the relevant positions for measuring a dihedral angle are indicated.

As shown in FIG. 16, a dihedral angle v of the wing tip device 9 is addressed. The dihedral angle v is measured with reference to a pitch axis p of the associated aircraft 1 in a plane spanned by the pitch axis p and the yaw axis y. The dihedral angle v1 of the front blade leading edge 23, when measured at the attachment end 19, corresponds to the dihedral angle v2 of the wing leading edge 11, when measured at the wing tip end 17. The dihedral angle v3 of the rear blade trailing edge 31, when measured at the attachment end 19, corresponds to the dihedral angle v4 of the wing trailing edge 13, when measured at the wing tip end 17. The dihedral angle v5 of the front blade 21, when measured at the front blade tip 35, in the present embodiment is approximately 55°. The dihedral angle v6 of the rear blade 27, when measured at the rear blade tip 37, in the present embodiment is approximately 35°.

Figure 17:
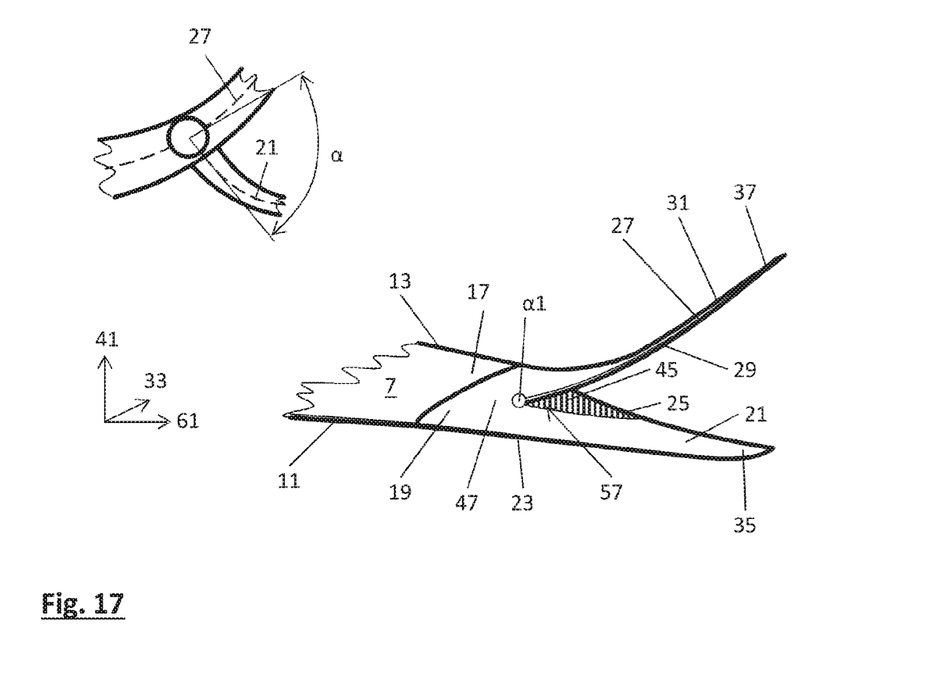
FIG. 17 is a perspective view from above of the section of FIG. 13, wherein the relevant positions for measuring a junction angle are indicated.
Figure 18:
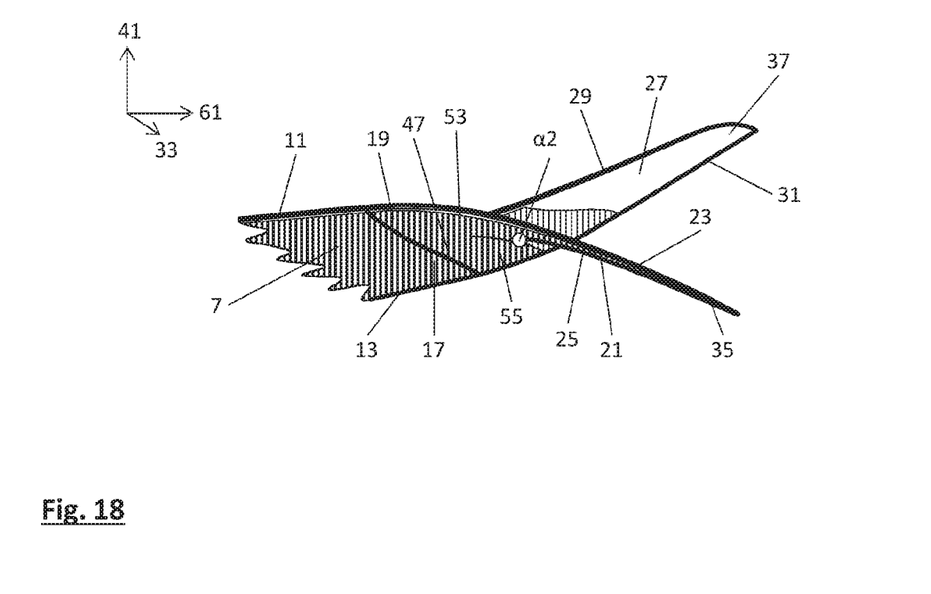
FIG. 18 is a perspective view from below of the section of FIG. 13, wherein the relevant positions for measuring a junction angle are indicated.

As shown in FIGS. 17 and 18, a junction angle α of the wing tip device 9 is addressed. The junction angle α is measured between the front blade 21 and the rear blade 27 along the junction line 57 in a plane spanned by the pitch axis p and the yaw axis y. The junction angle α1, when measured at the rear blade leading edge 29, in the present embodiment is approximately 15°. The junction angle α2, when measured at the front blade trailing edge 25, in the present embodiment is approximately 45°.

While at least one exemplary embodiment of the disclosure invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
   a main wing having a wing leading edge, a wing trailing edge opposite to the wing leading edge, a wing root end, and a wing tip end opposite to the wing root end; and
   a wing tip device having an attachment end which is attached to the wing tip end of the main wing, a front blade having a front blade leading edge and a front blade trailing edge, and a rear blade having a rear blade leading edge and a rear blade trailing edge;
   wherein the front blade and the rear blade extend away from the attachment end in a diverging manner, wherein the front blade leading edge extends in front of the rear blade leading edge and the front blade trailing edge extends in front of the rear blade trailing edge, when viewed in a chord direction,
   wherein at the end of the wing tip device opposite to the attachment end the front blade has a front blade tip and the rear blade has a rear blade tip, wherein at the front blade tip the front blade extends under a different dihedral angle than the rear blade at the rear blade tip, so that the front blade tip extends on a different level than the rear blade tip, when viewed in a wing thickness direction, wherein the front blade leading edge and the front blade trailing edge both have a tangent-continuous developing, and wherein the rear blade leading edge and the rear blade trailing edge both have a tangent-continuous developing, wherein the front blade leading edge extends tangent-continuously with the wing leading edge, and the rear blade trailing edge extends tangent-continuously with the wing trailing edge, and wherein the front blade trailing edge at least partially extends behind the rear blade leading edge, when viewed in the chord direction, so that the front blade and the rear blade overlap one another in an overlapping area, when viewed in the wing thickness direction.

2. A wing according to claim 1, wherein the front blade trailing edge intersects the rear blade leading edge, when viewed in the wing thickness direction, so that near the attachment end the front blade trailing edge extends behind the rear blade leading edge, and remote from the attachment end the front blade trailing edge extends in front of the rear blade leading edge, when viewed in the chord direction.

3. A wing according to claim 1, wherein the front blade trailing edge does not intersect the rear blade leading edge, when viewed in the wing thickness direction, so that along an entire front blade trailing edge and/or along an entire rear blade leading edge the front blade trailing edge extends behind the rear blade leading edge, when viewed in the chord direction.

4. A wing according to claim 1, wherein the main wing defines a wing plane, wherein the front blade extends downwards out of the wing plane and wherein the rear blade extends upwards out of the wing plane, with reference to the wing thickness direction.

5. A wing according to claim 1,
wherein the front blade trailing edge does not intersect the rear blade leading edge, when viewed in the wing thickness direction, so that along an entire front blade trailing edge and/or along an entire rear blade leading edge the front blade trailing edge extends behind the rear blade leading edge, when viewed in the chord direction, wherein the main wing defines a wing plane, wherein the front blade extends downwards out of the wing plane and wherein the rear blade extends upwards out of the wing plane, with reference to the wing thickness direction, and wherein the wing tip device is formed such that:
an extent of the overlapping area, when measured along a junction line, is between 5% and 30%, or between 15% and 25%, of an extent of the wing tip device in the chord direction, when measured at the attachment end, dihedral angle of the front blade leading edge, when measured at the attachment end, corresponds to dihedral angle of the wing leading edge, when measured at the wing tip end, dihedral angle of the rear blade trailing edge, when measured at the attachment end, corresponds to dihedral angle of the wing trailing edge, when measured at the wing tip end, dihedral angle of the front blade, when measured at the front blade tip, is between −10° and −60°, or between −20° and −45°, dihedral angle of the rear blade, when measured at the rear blade tip, is between 30° and 90°, or between 45° and 70°, a junction angle between the front blade and the rear blade along the junction line, when measured at the rear blade leading edge, is between 0° and 45°, or between 10° and 30°, and the junction angle between the front blade and the rear blade along the junction line, when measured at the front blade trailing edge, is between 45° and 100°, or between 50° and 80°.

6. A wing according to claim 1, wherein the main wing defines a wing plane, wherein the front blade extends upwards out of the wing plane and wherein the rear blade extends downwards out of the wing plane, with reference to the wing thickness direction.

7. A wing according to claim 1,
wherein the front blade trailing edge does not intersect the rear blade leading edge, when viewed in the wing thickness direction, so that along an entire front blade trailing edge and/or along an entire rear blade leading edge the front blade trailing edge extends behind the rear blade leading edge, when viewed in the chord direction, wherein the main wing defines a wing plane, wherein the front blade extends upwards out of the wing plane and wherein the rear blade extends downwards out of the wing plane, with reference to the wing thickness direction, and wherein the wing tip device is formed such that:
an extent of the overlapping area, when measured along a junction line, is between 5% and 25%, or between 10% and 15%, of an extent of the wing tip device in the chord direction, when measured at the attachment end, dihedral angle of the front blade leading edge, when measured at the attachment end, corresponds to dihedral angle of the wing leading edge, when measured at the wing tip end, dihedral angle of the rear blade trailing edge, when measured at the attachment end, corresponds to dihedral angle of the wing trailing edge, when measured at the wing tip end, dihedral angle of the front blade, when measured at the front blade tip, is between 30° and 90°, or between 45° and 70°, dihedral angle of the rear blade, when measured at the rear blade tip, is between −20° and −60°, or between −30° and −45°, a junction angle between the front blade and the rear blade along the junction line, when measured at the rear blade leading edge, is between 0° and 45°, or between 10° and 30°, and the junction angle between the front blade and the rear blade along the junction line, when measured at the front blade trailing edge, is between 45° and 100°, or between 50° and 80°.

8. A wing according to claim 1, wherein the main wing defines a wing plane, wherein the front blade extends in the wing plane and wherein the rear blade extends upwards out of the wing plane, with reference to the wing thickness direction.

9. A wing according to claim 1,
wherein the front blade trailing edge does not intersect the rear blade leading edge, when viewed in the wing thickness direction, so that along an entire front blade trailing edge and/or along an entire rear blade leading edge the front blade trailing edge extends behind the rear blade leading edge, when viewed in the chord direction, wherein the main wing defines a wing plane, wherein the front blade extends in the wing plane and wherein the rear blade extends upwards out of the wing plane, with reference to the wing thickness direction, and wherein the wing tip device is formed such that:
- an extent of the overlapping area, when measured along a junction line, is between 5% and 15%, or between 5% and 10%, of an extent of the wing tip device in the chord direction, when measured at the attachment end,
- dihedral angle of the front blade leading edge, when measured at the attachment end, corresponds to dihedral angle of the wing leading edge, when measured at the wing tip end,
- dihedral angle of the rear blade trailing edge, when measured at the attachment end, corresponds to dihedral angle of the wing trailing edge, when measured at the wing tip end,
- dihedral angle of the front blade, when measured at the front blade tip, corresponds to dihedral angle of the wing leading edge, when measured at the wing tip end,
- dihedral angle of the rear blade, when measured at the rear blade tip, is between 30° and 90°, or between 45° and 70°,
- a junction angle between the front blade and the rear blade along the junction line, when measured at the rear blade leading edge, is between 0° and 45°, or between 10° and 30°, and
- the junction angle between the front blade and the rear blade along the junction line, when measured at the front blade trailing edge, is between 20° and 60°, or between 30° and 45°.

10. An aircraft comprising the wing according to claim 1.

11. A wing according to claim 1, wherein the front blade and the rear blade have a common base section and separate tip sections, wherein the base section is defined between the front blade leading edge, the rear blade trailing edge, the attachment end, and opposite to the attachment end a front blade root where a front blade tip section is rooted in the base section, and a rear blade root where a rear blade tip section is rooted in the base section, wherein between the front blade root and the rear blade root, when viewed in the wing thickness direction, a junction line is provided.

12. A wing according to claim 11, wherein the wing tip device is formed and attached to the main wing such that:
- a sweep angle of the front blade leading edge, when measured at the attachment end, corresponds to sweep angle of the wing leading edge, when measured at the wing tip end, and between 25° and 45°,
- a sweep angle of the front blade trailing edge, when measured at the front blade root, corresponds to an angle between the sweep angle of the wing trailing edge and the sweep angle of the wing leading edge, when measured at the wing tip end, and between 20° and 40°,
- a sweep angle of the rear blade leading edge, when measured at the rear blade root, corresponds to an angle between the sweep angle of the wing leading edge and twice the sweep angle of the wing leading edge, when measured at the wing tip end, and between 25° and 45°,
- a sweep angle of the rear blade trailing edge, when measured at the attachment end, corresponds to the sweep angle of the wing trailing edge, when measured at the wing tip end, and between 20° and 40°,
- a sweep angle of the front blade leading edge, when measured at the front blade tip, corresponds to an angle between the sweep angle of the wing leading edge and twice the sweep angle of the wing leading edge, when measured at the wing tip end, and between 45° and 60°,
- a sweep angle of the front blade trailing edge, when measured at the front blade tip, corresponds to an angle between the sweep angle of the wing trailing edge and twice the sweep angle of the wing leading edge, when measured at the wing tip end, and between 40° and 55°,
- a sweep angle of the rear blade leading edge, when measured at the rear blade tip, corresponds to an angle between the sweep angle of the wing leading edge and twice the sweep angle of the wing leading edge, when measured at the wing tip end, and between 45° and 60°, and
- a sweep angle of the rear blade trailing edge, when measured at the rear blade tip, corresponds to an angle between the sweep angle of the wing trailing edge and twice the sweep angle of the wing trailing edge, when measured at the wing tip end, and between 40° and 55°.

13. A wing according to claim 11, wherein the wing tip device is formed such that:
- an extent of the front blade in the chord direction, when measured at the front blade root, is between 20% and 80%, or between 40% and 60%, of the extent of the wing tip device in the chord direction, when measured at the attachment end,
- the extent of the front blade in the chord direction, when measured at the front blade tip, is between 10% and 40%, or between 15% and 30%, of the extent of the wing tip device in the chord direction, when measured at the attachment end,
- an extent of the rear blade in the chord direction, when measured at the rear blade root, is between 20% and 80%, or between 40% and 60%, of an extent of the wing tip device in the chord direction, when measured at the attachment end, and
- the extent of the rear blade in the chord direction, when measured at the rear blade tip, is between 10% and 40%, or between 15% and 30%, of the extent of the wing tip device in the chord direction, when measured at the attachment end.

14. A wing according to claim 11, wherein the wing tip device is formed such that:
- an extent of the front blade in a span direction, when measured between the attachment end and the front blade tip, is between 50% and 300%, or between 100% and 200%, of an extent of the wing tip device in the chord direction, when measured at the attachment end,
- an extent of the rear blade in a span direction, when measured between the attachment end and the rear blade tip, is between 50% and 300%, or between 100% and 200%, of the extent of the wing tip device in the chord direction, when measured at the attachment end.

* * * * *